(12) United States Patent
Doebele et al.

(10) Patent No.: US 7,467,038 B2
(45) Date of Patent: Dec. 16, 2008

(54) PROCEDURE FOR THE DETECTION OF THE DIRECTION OF ROTATION AND SECONDARY SIDE OF A STARTING CLUTCH

(75) Inventors: Bernd Doebele, Salem (DE); Norbert Wiencek, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 445 days.

(21) Appl. No.: 11/284,420

(22) Filed: Nov. 21, 2005

(65) Prior Publication Data

US 2006/0116241 A1 Jun. 1, 2006

(30) Foreign Application Priority Data

Nov. 26, 2004 (DE) .................... 10 2004 057 122

(51) Int. Cl.
*B60W 10/02* (2006.01)
(52) U.S. Cl. .................... 701/67; 477/70; 477/87; 477/78
(58) Field of Classification Search .................... None
See application file for complete search history.

(56) References Cited

U.S. PATENT DOCUMENTS

| | | | | |
|---|---|---|---|---|
| 4,475,637 | A | * | 10/1984 | Oguma et al. .................... 477/86 |
| 5,176,234 | A | * | 1/1993 | Reik et al. .................... 192/53.2 |
| 6,126,569 | A | * | 10/2000 | Genise .................... 477/91 |
| 6,375,596 | B1 | | 4/2002 | Steeby |
| 6,662,095 | B1 | | 12/2003 | Habeck |
| 2004/0132580 | A1 | | 7/2004 | Metzger et al. |

FOREIGN PATENT DOCUMENTS

| | | |
|---|---|---|
| DE | 42 29 024 A1 | 3/1994 |
| DE | 199 37 052 A1 | 2/2000 |
| DE | 199 32 052 A1 | 1/2001 |
| DE | 103 45 906 A1 | 4/2004 |
| EP | 1 186 792 A1 | 3/2002 |

* cited by examiner

*Primary Examiner*—Michael J. Zanelli
(74) *Attorney, Agent, or Firm*—Davis Bujold & Daniels, P.L.L.C.

(57) ABSTRACT

A method for detecting a rotational direction of the secondary side of a starting clutch in a motor vehicle string comprising the steps of determination of the primary speed of rotation of the primary side and of the secondary speed of rotation of the starting clutch. If the secondary speed of rotation is greater than the primary speed of rotation, an actuator operates in a closing direction, whereby the degree of closure of the starting clutch is adjusted to be dependent upon the acceleration of the secondary speed of rotation. A specified value for a rotational speed of the driving motor is produced which represents the secondary speed of rotation. To the extent that this value exceeds the value of the primary rotational speed, the rotational speed of the motor is regulated to the specified value. If the primary and secondary rotational speeds are equivalent within a preselected period of time, then detecting the same rotational direction for the primary and secondary sides of the starting clutch. If the rotational speed of the primary side of the starting clutch lies below the idling speed of rotation, detecting different rotational directions for the primary side and the secondary side of the starting clutch.

18 Claims, 1 Drawing Sheet

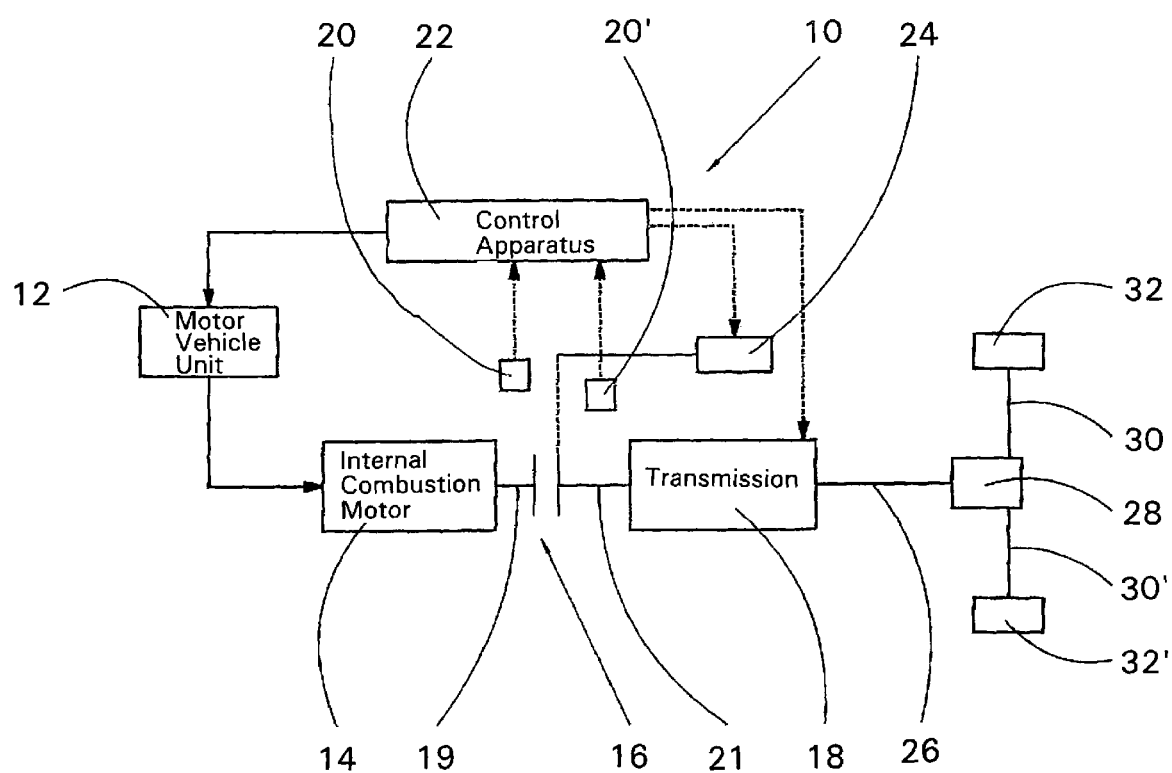

PROCEDURE FOR THE DETECTION OF THE DIRECTION OF ROTATION AND SECONDARY SIDE OF A STARTING CLUTCH

This application claims priority from German Application Serial No. 10 2004 057 122.8 filed Nov. 26, 2004.

FIELD OF THE INVENTION

The invention concerns a procedure for the detection of the direction of rotation of a secondary side of a starting clutch.

BACKGROUND OF THE INVENTION

The technology is already known of automating conventional starting clutches by hydraulic, pneumatic or electric motor powered actuators together with one of the actuator control circuits in such a way, that the formerly necessary, driver-operated clutch pedal can be eliminated. In such a case, the control circuitry is provided with speed of rotation sensors, which determine the rotary speed of an internal combustion motor and/or the rotary speed of input to a starting clutch in the following drive string. It is possible that a control circuit can so regulate the actuator, that the starting clutch engages itself with minimal kickback, this being dependent, respectively, upon the speed of rotation of the motor and that of the input to the transmission. Dependency may also lie on other operational parameters determined by appropriate sensors. In order to avoid flooding an internal combustion motor upon stopping, the starting clutch is controlled to go into a complete state of non-engagement as soon as the speed of rotation of the motor drops below a predetermined speed of rotation-threshold, which is less than that of the idling speed of the motor.

As a rule, a motor vehicle sets itself in motion in that the torque of the secondary sided clutch incrementally approaches the torque of the driving motor. If the resistance to movement is such that the vehicle, without the input of drive-torque, sets itself in motion, there exists a development of an unacceptably high speed of rotation for the clutch disk. Accordingly, for the prevention of an uncontrolled acceleration, the necessity arises of shutting down the vehicle by closing the clutch.

The aforesaid situation of the rolling-start, that is to say, an external starting of a vehicle, can be carried out in a given gear, even if the rolling start equipment situation is appropriate or inappropriate. For example, if the direction of rolling is contrary to that called for by the gearsetting, then the clutch engagement for the shutting down of the vehicle, dependent upon the kinetic energy thereof, leads either to a reversal of the direction of travel of the vehicle or to a reduction of the speed of rotation of the motor. In an extreme case, this can even bring about a reversal of the direction of rotation of the motor.

Conventionally, it is necessary for a motor vehicle starting gear train to function in an orderly way so that the motor vehicle moves itself in a direction defined by a current gearsetting in the transmission, particularly if false reactions of the clutch control circuit which regulates clutch closure are to be avoided. In other words, the motor vehicle should only move forwards, if one of the forward travel gears is engaged, and likewise, should only move backwards, if the reverse gear has been set. If a motor vehicle moves itself forward, for example, by externally applied rolling on a road incline, but is set in a reverse gear, then, dependent upon the type of control arrangement, the possibility is, that in this situation, in spite of an effort of the driver to start, the clutch of the vehicle cannot be engaged or else, without any starting effort, the clutch fully engages itself and thereby the motor is flooded.

DE 199 32 052 A1 discloses a process for the detection of the direction of rotation of an output shaft of an automatic transmission, when a motor vehicle rolls. In this case, an operating parameter, which involves a time lapse, is determined and compared with the actual values for the existing state of travel. In short, gear change synchronization is computed and compared with the true travel condition.

A disadvantage of this process is to be found therein, in that actual input values can vary in accordance with the type of motor vehicle. It is also possible that the computational values can be dependent upon the state of the vehicle at the time of determination. Thus, it is necessary, that the values must be selected with respect to the type of vehicle and, in a worst-case situation, in connection with the loading carried by the vehicle. This requires an excessive need for computer memory. Further, it is of disadvantage that the computations for gear mesh synchronicity are time-intensive, which can lead to delayed shifting operations. Accordingly, to carry out this process demands much design work, which is necessarily accompanied by relatively high cost.

The purpose of the invention is to introduce a procedure with which in a simple manner, the directions of rotation of the input and output components of a starting clutch are individually detected, both from the standpoint of a faulty reaction of the automatic activation of the starting clutch, and that inordinate vehicle motion can be prevented, when the selected transmission gear does not match the direction of travel of the vehicle. According to the invention, the use of a separate direction-determining sensor can be dispensed with.

The vehicle transmission gear train will be altered with the installation of a starting clutch responsive to an actuator, that is to say, the starting clutch is to operate on a centrifugal force basis.

SUMMARY OF THE INVENTION

According to a first alternative of the invention, the purpose can be achieved by a procedure for the determination of the direction of rotation of a secondary side of a starting clutch, which bound to an input transmission shaft. The starting clutch is automated, reacts to control, is spring loaded and, according to the above, is responsive to an activator. In comparison thereto, the primary side of the starting clutch is connected to a drive shaft of a driving motor. The achievement of the purpose is carried out by the following steps:

determination of the primary speed of rotation of the primary side and of the secondary speed of rotation of the starting clutch;

insofar as the secondary speed of rotation is greater than the primary speed of rotation the actuator acts in the closure direction, whereby the degree of closure of the starting clutch will be adjusted, dependent upon the acceleration of the secondary speed of rotation;

the production of a specified value for a speed of rotation for the driving motor, the value of which represents the secondary speed of rotation, as long as this exceeds the value of the primary speed of rotation;

regulation of the speed of rotation of the internal combustion motor to the specified value;

detection of the same direction of rotation of the primary side and the secondary side of the starting clutch if the primary speed of rotation and the secondary speed of rotation are to be found equivalent within a preselected period of time, and the detection of different directions of the primary side and the secondary side of the starting clutch, if the speed of rotation of the primary side of the starting clutch—that is to say, that of the internal combustion motor—lies under the idling speed of rotation of the same.

Using this procedure and without the use of a separate sensor for the determination of direction of rotation, the possibility arises, based on a clutch engagement which is instigated by changes of direction of rotation of the input and output sides of the starting clutch, of closing the components along with subsequent effects.

The invented procedure sets up the requirement that the vehicle be equipped with a driving motor, which motor allows itself to be influenced in regard to its given torque and/or its speed of rotation. Under the classification of such motors can be found all internal combustion motors as well as, for example, electric motors, which latter can be regulated and controlled by way of electric control apparatuses.

The variation of the degree of engagement at a transition occurring at a change in speed of the vehicle, enables a control action, first, between a necessarily abrupt clutch engagement upon a quickly accelerating speed and, second, a soft clutch engagement during a less dynamic speed increase.

In the case of a different direction of travel at the starting clutch, a step of positioning the starting clutch during one of the degrees of closure, dependent upon the acceleration of the secondary speed of rotation, acts to effect a reduction of the motor speed of rotation to a point less than the idling speed. Contrarily, if the directions are the same, a compensation of the speeds of rotation can be carried out.

In an advantageous embodiment of this procedure, provision has been made, that under a circumstance when the primary speed of rotation falls below a predetermined threshold value, at least in one computerized control apparatus, a first status marker is stored in regard to the opposite directions of rotation between the primary side and the secondary side and the starting clutch is subsequently opened. The threshold speed of rotation value lies, in this case, advantageously greater than the idling speed of rotation.

The mentioned status marker regarding the presence of oppositely directed rotary motions of the primary side and the secondary side of the starting clutch, gives notice that direction of motion of the vehicle does not necessarily coincide with that provided by the selected and currently active gear stage. This will be made use of in additional control purposes.

When noted by a stored first status marker that because the opposite rotational directions at the starting clutch exist and, therefore, the secondary speed of rotation is overstepping, a predetermined speed of rotation, for safety reasons, provision can be made to automatically switch the transmission into its neutral position.

The purpose of the invention is achieved for a drive gear train with a centrifugal clutch functioning in a procedure and takes advantage of the specialties of this type of clutch and makes use of its integral activation functions.

According to the above, this procedure serves for the detection of the direction of rotation of a secondary side of a starting clutch which is bound to an input shaft of a transmission with a mechanical centrifugal clutch of a motor vehicle. This stated arrangement is in comparison with the primary side of the starting clutch connected to the drive shaft of a driving motor and is characterized by the following procedure steps:

the determination of the speed of rotation of both the primary side and the secondary side of the starting clutch; insofar as the rotational speed of the secondary side is greater than the rotational speed of the primary side;

increasing the speed of rotation of the drive motor for a predetermined period of time $\Delta t$ up to a threshold value which is dependent on the acceleration of the secondary speed of rotation, whereby a certain clutch torque is quickly established;

determining equal directions of rotation of the primary side and the secondary side of the starting clutch, when the primary speed of rotation and the secondary speed of rotation adjust to one another during a predetermined time period, and determining different directions of rotation of the primary side and the secondary side of the starting clutch, when the speed of rotation of the primary side of the starting clutch is to say, the speed of rotation of the internal combustion motor or the clutch torque declines.

A case can now be considered, wherein the speeds of rotation at the starting clutch are equal. For this situation, the above third step is undertaken, wherein the primary speed of rotation of the internal combustion motor is increased by way of the motor control. This is done as specified within a time period of $\Delta t$ up to a value dependent upon the acceleration of the secondary speed of rotation. This action leads to equal speeds between the input side and the output side of the centrifugal clutch and also between the drive shaft of the driving motor and the transmission input shaft.

In the presence of different directions of rotation at the starting clutch, it is possible that a reduction in the motor speed of rotation to a point below the idling speed of rotation can not be carried out because of inherent characteristics of the centrifugal clutch. This clutch opens itself much more readily with adjustment even before reaching this speed of rotation.

By way of this second procedure variant, and without the insertion of a separate direction of a rotation sensor, it is possible for a drive string having a centrifugal clutch, to close the clutch due to the action of clutch engagement during a difference of input and output rotation between the primary and secondary sides and subsequently react thereon.

The advantages named in connection with the first procedure variant for actuator operated starting clutches are valid also for this procedure. Even with this procedure, in a preferred embodiment, provision can be made that after the detection of different directions of rotation, at least in a control apparatus, a second status marker be stored in regard to the presence of oppositely disposed directions of rotation of the primary side and the secondary side of the starting clutch. This second status marker is advantageously of value for additional control functions.

In addition it is of advantage, if, after the storage of the second status marker, the rotational speed of the drive motor is adjusted to idling speed, whereby the centrifugal clutch opens and the drive connection between the driving motor and the transmission is interrupted.

In order to provide more safety during operation of such a motor vehicle, according with an additional procedural variant, the proposal is that if, by a stored second status marker regarding the existence of oppositely disposed directions of rotation, the secondary speed of rotation oversteps a predetermined rotational speed level, then the transmission shifts into its neutral position.

The speed of rotation level predetermined for both procedure alternatives corresponds to that differential speed of rotation, which must be other than that speed of rotation which contributes to the destruction of a starting clutch and/or that which leads to an uncomfortable clutch engagement.

In a further version of both procedural variants, an additional proposal calls for the deletion of the first or second status marker regarding the existence of an oppositely disposed direction of rotation, if the secondary speed of rotation shows a value of zero, that is, the vehicle is stationary. By means of this measure, the achievement is that the status marker presently available can only exert control on a drive string if a standing vehicle is brought into motion.

Finally, it is seen as advantageous for safe operation of a vehicle, if, after a forced shifting of the transmission into its neutral position, before a renewed engagement of a transmission stage, in a first action the neutral position of the transmission must be activated by a "neutral" safety switch. In this way, assurance is given that the driver of the vehicle recognizes the automatically imposed neutral gear position of the transmission and the safety switch has, of itself, made the engagement. With this information as background, the driver can then move the safety switch, i.e. the gear train selector lever, into an actually intended gear or driving position.

BRIEF DESCRIPTION OF THE DRAWINGS

The invention will now be described, by way of example, with reference to the accompanying drawings in which:

The sole FIGURE is a schematic representation of an assembly of a motor vehicle drive string with an apparatus for carrying out of the invented procedure for detection and interpretation of a reversing direction of rotation for an automatically controlled, spring loaded starting clutch which clutch is further activated by an actuator.

DETAILED DESCRIPTION OF THE INVENTION

To the drive string of a motor vehicle 10 belongs, as shown, a driving motor constructed as an internal combustion motor 14 and a transmission 18. These named driving components technologically interconnect with one another through a starting clutch 16. The starting clutch 16 includes a primary sided clutch element, which is bound to a crankshaft 19 of the internal combustion motor 14. Also a corresponding element of the starting clutch 16 is a secondary clutch element, which is an active, driving connection with a transmission input shaft 21 of the transmission 18. The output torque of the transmission 18 is communicated to a differential gearing 28 by a transmission output shaft 26. From the differential gearing 28, the torque is respectively transferred by axle shafts 30, 30' to vehicle running wheels 32, 32'.

As may be easily inferred from this drawing, the primary side of the starting clutch 16, when said clutch is open, rotates with the speed of rotation of the crankshaft 19. Insofar as the starting clutch 16 is closed and the vehicle moves itself in the predetermined direction as set by the current transmission gear stage, i.e., forward or in reverse, then the secondary side of the clutch 16 and the transmission input shaft 21 assume the same direction and speed of rotation as the crankshaft 19.

Again, if the starting clutch 16 is open, the transmission input shaft 21 is motionless, when the vehicle is stationary, but meanwhile the speed of rotation of the crankshaft 19, for example, now runs over the idling rotational speed of the internal combustion motor 14, and rotates in a direction which is determined by the design of the internal combustion motor 14.

The possibility exists, however, that the transmission input shaft 21 can also be turned, in a case of a vehicle moving itself, through the successive combination of the vehicle wheels 32 and 32', the axle halves 30 and 30', the differential gearing 28, the transmission output shaft 26 and the transmission 18 during an open starting clutch 16. Depending on the motion direction of the vehicle and the selected gear, it is possible that the transmission input shaft 21, in this situation, rotates in either one or the opposite direction, and thereby may exhibit a rotation different in speed and direction from that of the crankshaft 19. This has already been explained in the introductory passages.

For the determination of the speed of rotation of the crankshaft 19 and the transmission input shaft 21, two tachometric sensors 20 and 20' are placed on the drive train which, relative to the starting clutch 16, determine a primary speed of rotation $U_{Prim}$ at the output of the internal combustion motor 14 and a secondary speed of rotation $U_{Sek}$ at the input of the transmission 18. These tachometric sensors 20, 20' are connected by (not further shown) sensor lines with a control apparatus 22.

For the carrying out of the procedure, according to the invention, for the determination of the direction of the rotation of the secondary side of the starting clutch 16, an actuator 24 to the starting clutch 16 is commanded by the control apparatus 22 to close the starting clutch 16, if the secondary rotational speed $U_{Sek}$ of the transmission input, that is to say, the secondary side of the starting clutch 16 is greater than the primary speed of rotation $U_{Prim}$ of the internal combustion motor 14.

At this point, the starting clutch 16 is closed to a degree of closure determined by the acceleration of the secondary speed of rotation $U_{Sek}$. Thereupon, activated by a lead of the secondary speed of rotation $U_{Sek}$ in excess of the primary speed of rotation $U_{Prim}$, a motor control unit 12 is fed a specified speed of rotation, which is related to the secondary speed of rotation $U_{Sek}$, and, advantageously should be the same. By means of computer response to this specified speed of rotation, the motor control unit 12 regulates the primary speed of rotation $U_{Prim}$ of the internal combustion motor 14.

Within the control apparatus 22 is placed a detection device (not shown) for the determination of a reduction of the primary speed of rotation $U_{Prim}$ of the internal combustion motor 14 to a value below that of an idling speed of rotation. This detection device determines, by way of a reduction of the primary speed of rotation $U_{Prim}$ to a value lower than that of the idling rotational speed that the primary side of the starting clutch 16 in comparison to that of the secondary side exhibits a direction of rotation which is opposite in its direction.

Insofar as the difference in speed of rotation, in a case of oppositely direction rotations, is too great and the primary speed of rotation $U_{Prim}$ drops below a thereto connected threshold of speed of rotation, then the control apparatus 22 sends a control demand to the actuator 24 for the opening of the starting clutch 16. In this way, assurance is given that an engagement of the starting clutch 16 will not be too abrupt and further mechanical damage to the starting clutch 16 is thereby avoided.

Insofar as the different speeds of rotation between the primary side and the secondary side of the starting clutch become too great, by way of the control apparatus 22, a command is sent to the transmission 18, wherein a second (not shown) actuator in or on the transmission 18, shifts the transmission 18 to a neutral position.

Reference Numerals 10 motor vehicle
12 motor vehicle unit
14 internal combustion motor
16 starting clutch
18 transmission (for shifting)
19 crankshaft (motor drive shaft)
20, 20' tachometric sensors (RPM)

21 transmission input shaft
22 control apparatus
24 actuator
26 transmission output shaft
28 differential gearing
30, 30' axle shafts for drive
32, 32' wheel of vehicle
$M_{Kuppel}$ clutch torque (moment)
$U_{Leer}$ idling rotational speed
$U_{Prim}$ primary rotational speed
$U_{Sek}$ secondary rotational speed
$U_{Soll}$ preselected rotational speed
$U_{Niv}$ preselected threshold level
$\Delta t$ duration of time

The invention claimed is:

1. A method for determining a direction of rotation of a secondary side of an automatic starting clutch (16) of a motor vehicle (10), the secondary side of the starting clutch (16) being connected to a transmission input shaft (21) and a primary side of the staring clutch (16) being connected to an output shaft (19) of a drive motor (14), the method comprising the steps of:
   comparing a primary speed of rotation ($U_{Prim}$) of the primary side of the staring clutch (16) and a secondary speed of rotation ($U_{Sek}$) of the secondary side of the starting clutch (16), and
   when the secondary speed of rotation ($U_{Sek}$) is greater than the primary speed of rotation ($U_{Prim}$),
   engaging the starting clutch (16) by a degree of closure dependent upon a resulting acceleration of the secondary speed of rotation ($U_{Sek}$);
   determining a specified value for a speed of rotation ($U_{Soll}$) for the drive motor (14) that is proportional to the secondary speed of rotation ($U_{Sek}$) of the starting clutch (16) and exceeds the primary speed of rotation ($U_{Prim}$) of the starting clutch (16); and
   regulating the drive motor (14) so that the primary speed of rotation ($U_{Prim}$) of the starting clutch (16) is equal to the specified value ($U_{Soll}$);
   determining and comparing the primary speed of rotation ($U_{Prim}$) and the secondary speed of rotation ($U_{Sek}$) of the staring clutch (16), during a preselected period of time, and
   when the primary speed of rotation ($U_{Prim}$) and the secondary speed of rotation ($U_{Sek}$) of the starting clutch (16) are equivalent to one another, within the preselected period of time, indicating that the directions of rotation of the primary side and the secondary side of the starting clutch (16) are the same; and
   comparing the speed of rotation of the primary side of the starting clutch (16) and an idling speed of rotation ($U_{Leer}$) of the drive motor (14), and
   when the speed of rotation of the primary side of the starting clutch (16) is less that the idling speed of rotation ($U_{Leer}$) of the drive motor (14), indicating that the directions of rotation of the primary side and the secondary side of the starting clutch (16) are different.

2. The method according to claim 1, further comprising the step of storing a first status marker within a control apparatus (22) when the primary speed of rotation ($U_{Prim}$) drops below a predetermined threshold value, and the existence of oppositely running rotational directions of the primary side and the secondary side of the starting clutch (16) and subsequently disengaging the starting clutch (16).

3. The method according to claim 2, further comprising step of having the threshold value of the rotational speed lie above the idling speed of rotation ($U_{Leer}$).

4. The method according to claim 2, further comprising the step of deleting one or more of the first status marker, regarding the presence of oppositely running rotation directions, if the secondary speed of rotation ($U_{Sek}$) exhibits the value of zero identifying that the vehicle is stationary.

5. The method according to claim 1, further comprising the step of shifting a transmission (18) into a neutral position if the secondary speed of rotation ($U_{Sek}$) oversteps a preselected threshold level ($U_{Niv}$), when a stored first status marker recognizes the existence of oppositely running directions of rotation.

6. The method according to claim 5, further comprising the step of
   corresponding the preselected threshold level ($U_{Niv}$) to the value of different speeds of rotation, but avoiding that rotational speed which leads to a destruction of the starting clutch (16) through an abrupt engagement of the clutch.

7. The method according to claim 5, further comprising the step of confirming the neutral position of the transmission (18) by a "neutral" safety switch following a forced shifting of the transmission (18) into a neutral position for the renewed engagement of a transmission gear stage.

8. A method of detecting a direction of rotation of a secondary side of a mechanical, centrifugal starting clutch (16) having a primary side connected to an output shaft (19) of a drive motor (14) and a secondary side connected to an input shaft (21) of a transmission (18), the method comprising the steps of:
   determining and comparing a primary speed of rotation ($U_{Prim}$) of the primary side of the starting clutch (16) and a secondary speed of rotation ($U_{Sek}$) of the secondary side of the starting clutch (16);
   when the secondary speed of rotation ($U_{Sek}$) of the secondary side of the starting clutch (16) is greater than the primary speed of rotation ($U_{Prim}$) of the primary side of the starting clutch (16),
   establishing a predetermined clutch torque ($M_{Kuppel}$) by increasing a speed of rotation of the output shaft (19) of the drive motor (14) for a predetermined period of time ($\Delta t$) and up to a predetermined value which is proportion to an acceleration of the secondary speed of rotation ($U_{Sek}$),
   determining and comparing the primary speed of rotation ($U_{Prim}$) and the secondary speed of rotation ($U_{Sek}$) of the starting clutch (16) during the predetermined period of time, and
   when the primary speed of rotation ($U_{Prim}$) and the secondary speed of rotation ($U_{Sek}$) are equal, indicating that the directions of rotation of the primary and the secondary sides of the starting clutch (16) are the same, and
   when the primary speed of rotation of the primary side of the starting clutch (16) decreases during the predetermined period of time, indicating that the directions of rotation of the primary side and the secondary side of the starting clutch are different.

9. The method according to claim 8, further comprising the step of saving a status marker in a control apparatus (22), regarding the existence of oppositely directed rotation of the primary side and the secondary side of the starting clutch (16), when different directions of rotation are detected.

10. The method according to claim 9, further comprising the step of adjusting the speed of rotation of the drive motor (14) to that of an idling speed of rotation ($U_{Leer}$), in accord with the saving of the status marker, whereby the starting clutch (16) is disengaged.

11. The method according to claim 9, further comprising the step of shifting the transmission (18) into a neutral position, if the secondary speed of rotation ($U_{Sek}$) oversteps a predetermined speed of rotation level ($U_{Niv}$), in a case of a stored status marker signifies the presence of oppositely disposed directions of rotation.

12. A method for determining a rotational direction of a secondary side of an automotive centrifugal starting clutch (16) in which the secondary side of the starting clutch (16) is connected to a transmission input shaft (21) while a primary side of the starting clutch (16) is connected to a drive shaft (19) of a drive motor (14), the method comprising the following steps:

sensing a primary rotational speed ($U_{Prim}$) of the primary side and a secondary rotational speed ($U_{Sek}$) of the secondary side of the starting clutch (16);

if the sensed secondary rotational speed ($U_{Sek}$) exceeds the sensed primary rotational speed ($U_{Prim}$), increasing of the speed of the drive motor for a specified period ($\Delta t$) to a nominal speed value which is dependent on an acceleration of the secondary rotational speed ($U_{Sek}$) and results in the setting of a specific clutch torque ($M_{clutch}$);

following convergence of the primary rotational speed ($U_{Prim}$) and the secondary rotational speed ($U_{Sek}$) with one another, within the specified period, sensing a rotational direction of the primary side and the secondary side of the starting clutch (16); and following a drop in one of (a) the rotational speed of the primary side of the starting clutch (16), (b) the speed of the combustion engine ($U_{Prim}$), and (c) the clutch torque ($M_{clutch}$), sensing any divergence of the rotational direction of the primary side and the secondary side of the starting clutch (16).

13. The method according to claim 12, wherein following recognition of divergence of the rotating direction, storing a marker in at least one control unit (22) for the presence of opposed rotating directions of the primary side and the secondary side of the starting clutch (16).

14. The method according to claim 13, further comprising the step of, following storage of the marker, setting the speed of the drive motor (14) to an idling speed ($U_{idle}$) which results in disengagement of the starting clutch (16).

15. The method according to claim 13, further comprising the step of setting a transmission (18) in a Neutral position if the secondary rotational speed ($U_{Sek}$) exceeds a preset speed level ($U_{lev}$), with the marker being stored in the at least one control unit (22).

16. The method according to claim 15, further comprising the step of setting the preset speed level ($U_{lev}$) equivalent to a differential speed level at which one of destruction of the starting clutch (16) and an uncomfortable clutch engagement can be expected.

17. The method according to claim 15, further comprising the step of, following a shift of the transmission (18) to the Neutral position for a renewed engagement of a gear, acknowledging the neutral position of the transmission (18) by a Neutral selector lever position.

18. The method according to claim 13, further comprising the step of cancelling the marker when the secondary rotational speed ($U_{Sek}$) value is at zero (vehicle standstill).

* * * * *